B. URQUHART.
TIRE RIM.
APPLICATION FILED APR. 5, 1911.

1,133,683.

Patented Mar. 30, 1915.

Witnesses
Allan F. Goose.
Lucile Kuhnholz

Inventor
B. Urquhart
By his Attorney
Grafton L. McGill

UNITED STATES PATENT OFFICE.

BENJAMIN URQUHART, OF PLAINFIELD, NEW JERSEY.

TIRE-RIM.

1,133,683.  Specification of Letters Patent.  Patented Mar. 30, 1915.

Application filed April 5, 1911. Serial No. 619,154.

*To all whom it may concern:*

Be it known that I, BENJAMIN URQUHART, of Plainfield, in the county of Union and State of New Jersey, have invented certain new and useful Improvements in Tire-Rims; and I do hereby declare the following to be a full, clear, and exact description of the invention, such as will enable others skilled in the art to which it appertains to make and use the same.

This invention contemplates an improved demountable tire rim, especially adapted for the wheels of automobiles. It is customary to make these rims in two parts or of a single split ring, the object being to permit of a partial collapse of the rim when removed from the wheel so as to reduce its circumference and thereby enable the shoe or tire to be slipped over the rim, after which the latter is snapped back into its circular form with its edges abutting.

The difficulties attending the use of the present forms of detachable rims are well known to the operators of motor vehicles. According to one form the rim is made of two rigid semi-circular parts, hinged together at diametrically opposite points of the circular structure, the sections collapsing so that one extremity of one section moves outside of the other section, its other extremity moving inside said other section. The structure thus assumes a substantially oval shape and the shoe or tire has to be bent into the same shape before it can be slipped over the ends of the sections. Furthermore by the described construction there is no material lessening of the size of the rim since the two rigid sections merely break joint and move out of register, and the extent to which the periphery is reduced at the point where the extremity of a section turns inward is counterbalanced at the opposite point where its other extremity moves outward.

Figure 1:
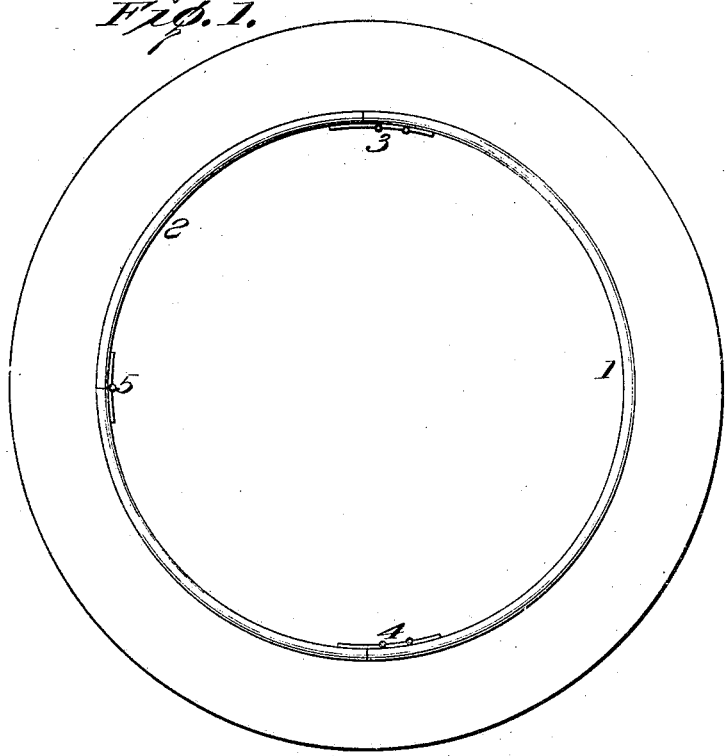
Figure 2:
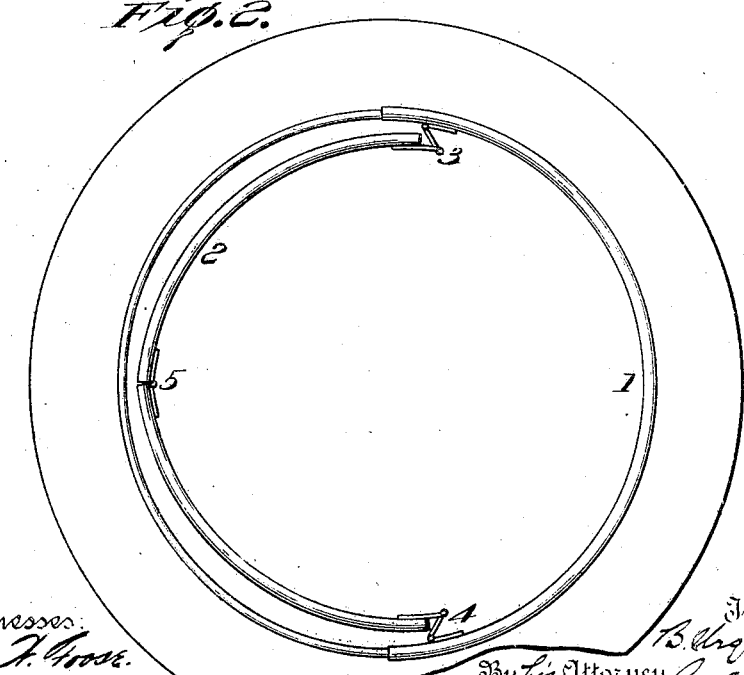

My invention is illustrated in the accompanying drawing, Figure 1 being a side elevation of the rim when set up and Fig. 2 showing it collapsed.

Referring to the drawing I have shown the rim consisting of two sections, 1, 2, each substantially of semi-circular formation. When these sections are joined together with their edges abutting they comprise the complete rim of circular formation. The section 2 has its extremities hinged to the extremities of section 1 as at 3 and 4 and the leaves of the hinges to which section 2 is secured turn inward as shown, the pivots of said hinges being inset from the extremities of the section 1. I make the section 2 in two parts hinged together as at 5, thus rendering that section partially collapsible itself and permitting its extremities to readily bend inward. In their collapsed position the extremities of the two-part section overlap the extremities of the section 1.

It will be apparent that the rim may be readily collapsed and without difficulty as there is no resistance to overcome and that in its collapsed form its circumference is so materially reduced that the shoe or tire may be placed over it without having to be bent or forced on at all.

It will be understood that the rim is suitably channeled or otherwise formed to receive the tire and that the rim in turn is to be secured by suitable means to the wheel, but as these form no part of this invention they are not shown or described.

I claim as my invention:—

A demountable tire rim having two sections, one section being composed of two parts pivoted together to fold toward each other, the extremities of said parts being connected to the other section each by a three-part hinge, the pivots of said hinges being inset from the ends of said last mentioned section to permit the extremities of the two-part section to fold within the extremities of the other section.

In testimony whereof, I have signed this specification in the presence of two subscribing witnesses.

BENJAMIN URQUHART.

Witnesses:
 EDWARD URQUHART,
 ASA F. RANDOLPH.